United States Patent
Usukura et al.

(10) Patent No.: US 7,688,403 B2
(45) Date of Patent: Mar. 30, 2010

(54) CIRCULARLY POLARIZING PLATE, VERTICALLY ALIGNMENT TYPE OF LIQUID CRYSTAL DISPLAY PANEL AND METHOD OF MANUFACTURING THE SAME

(75) Inventors: Naru Usukura, Tenri (JP); Manabu Abiru, Nara (JP); Takayuki Natsume, Tenri (JP); Koji Yamabuchi, Nara (JP); Makoto Nakahara, Nara (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 943 days.

(21) Appl. No.: 10/575,990

(22) PCT Filed: Oct. 20, 2004

(86) PCT No.: PCT/JP2004/015465

§ 371 (c)(1),
(2), (4) Date: Apr. 17, 2006

(87) PCT Pub. No.: WO2005/050269

PCT Pub. Date: Jun. 2, 2005

(65) Prior Publication Data

US 2007/0054066 A1    Mar. 8, 2007

(30) Foreign Application Priority Data

Nov. 20, 2003  (JP)  ............................. 2003-391330
Nov. 20, 2003  (JP)  ............................. 2003-391465

(51) Int. Cl.
*G02F 1/1335*  (2006.01)
*G02F 1/13*    (2006.01)

(52) U.S. Cl. ............................. 349/96; 349/98; 349/99; 349/102; 349/103; 349/117; 349/121; 349/187; 349/194

(58) Field of Classification Search .................... 349/96, 349/98, 99, 194, 102, 103, 117, 121, 187
See application file for complete search history.

(56) References Cited

U.S. PATENT DOCUMENTS

| | | | |
|---|---|---|---|
| 6,295,109 B1 * | 9/2001 | Kubo et al. | 349/119 |
| 2003/0218713 A1 | 11/2003 | Suzuki et al. | |
| 2003/0248713 | 11/2003 | Suzuki et al. | |
| 2004/0004688 A1 * | 1/2004 | Kawata et al. | 349/117 |
| 2004/0241344 A1 | 12/2004 | Kawanishi et al. | |

(Continued)

FOREIGN PATENT DOCUMENTS

JP    9090309    4/1997

(Continued)

*Primary Examiner*—Frank G Font
*Assistant Examiner*—Jerry Blevins
(74) *Attorney, Agent, or Firm*—Birch, Stewart, Kolasch & Birch, LLP

(57) ABSTRACT

A circularly polarizing plate includes a λ/4 phase difference plate and a linearly polarizing plate overlaid on a main surface of the λ/4 phase difference plate and having an absorption axis forming an angle of about 45° with respect to a lagging axis of the λ/4 phase difference plate. The λ/4 phase difference plate has reverse wavelength dispersion characteristics and an Nz coefficient of 1.6 or more. Employment of this structure can provide the circularly polarizing plate having good view angle characteristics and a vertical alignment type of liquid crystal display panel having the same.

10 Claims, 13 Drawing Sheets

U.S. PATENT DOCUMENTS

2006/0146408 A1 * 7/2006 Ushiro et al. ............... 359/566

FOREIGN PATENT DOCUMENTS

| | | |
|---|---|---|
| JP | 11-212077 A | 8/1999 |
| JP | 2000-9912 A | 1/2000 |
| JP | 2000-137116 A | 5/2000 |
| JP | 2000-231108 A | 8/2000 |
| JP | 2001075067 | 3/2001 |
| JP | 2001350131 | 12/2001 |
| JP | 2002040443 | 2/2002 |
| JP | 2003-57635 A | 2/2003 |
| JP | 2003-90915 A | 3/2003 |
| JP | 2003-121642 A | 4/2003 |
| JP | 2003-227925 A | 8/2003 |
| JP | 2003-232922 A | 8/2003 |
| JP | 2004004563 | 1/2004 |
| WO | WO-03/018672 A1 | 3/2003 |
| WO | WO-03/040772 A2 | 5/2003 |

* cited by examiner $nx>ny>nz$
$(nx-ny)\cdot d=1/4\,\lambda$

25° LINEARLY POLARIZING PLATE ROLL

−20° λ/4 PHASE DIFFERENCE PLATE nx=ny>nz $nx > ny = nz$
$(nx - ny) \cdot d = 1/4 \lambda$

CIRCULARLY POLARIZING PLATE, VERTICALLY ALIGNMENT TYPE OF LIQUID CRYSTAL DISPLAY PANEL AND METHOD OF MANUFACTURING THE SAME

TECHNICAL FIELD

The present invention relates to a circularly polarizing plate, a vertical alignment type of liquid crystal display panel and a method of manufacturing the same.

BACKGROUND ART

A liquid crystal display panel has two substrates between which liquid crystal is sealingly stored, and electrodes are formed on main surfaces of the substrates opposed together.

FIG. 27 is a schematic cross section of a liquid crystal display panel. Electrodes 24 are formed on a substrate 20 on a display side, and electrodes 25 are formed on an opposite substrate 21. Substrates 20 and 21 are adhered together by a seal member 22 with electrodes 24 and 25 opposed to each other. Spacers (not shown) keep a constant distance between substrates 20 and 21. A region surrounded by two substrates 20 and 21 and seal member 22 is sealingly filled with liquid crystal 23. In the present invention, a structure that includes liquid crystal sealingly stored between the two substrates, and is used as one liquid crystal display panel is referred to as an "individual liquid crystal display unit".

As one of alignment modes of liquid crystal, there is a vertical alignment mode (VA type) in which liquid crystal molecules are aligned vertically with respect to the main surface of the substrate. In the state where no voltage is applied across the electrodes, the longitudinal directions of the liquid crystal molecules are aligned vertically with respect to the main surface of the substrate. When a voltage is applied across the electrodes, the longitudinal direction of the liquid crystal molecules changes from a direction perpendicular to the main surface of the substrate to a direction parallel to the main surface of the substrate. This operation changes a retardation of the liquid crystal layer so that the liquid crystal display unit can perform multi-level or gradation display.

In the liquid crystal display panel using the vertical alignment mode, retardation of the liquid crystal is not present when a voltage is not applied (i.e., "residual retardation" is not present). Therefore, the liquid crystal display panel of the transparent type generally employs a normal black mode in which a linearly polarizing plate 49 is adhered in a state of cross nicols to the main surface of each of substrates 20 and 21 on the display side and the opposite side shown in FIG. 27. By arranging the polarizing plates as described above, black display can be performed to an extent similar to that by the cross nicols of the polarizing plates, and good contrast can be achieved.

As the vertical alignment mode, such a circular polarization mode is known that uses a circularly polarizing plate formed of a combination of a polarizing plate and a λ/4 phase difference plate instead of the foregoing polarizing plate. Since the circular polarization mode can perform reflection display, the circular polarization mode is suitable for a reflection type or a semitransparent type of liquid crystal display device.

FIG. 28 is a cross section of a circularly polarizing plate based on a prior art (see, e.g., Japanese Patent Laying-Open No. 2003-121642). A circularly polarizing plate has a structure in which a linearly polarizing plate 32 is overlaid on a λ/4 phase difference plate 30. Linearly polarizing plate 32 is provided at its main surface with a transparent protection plate 33. The liquid crystal display panel can perform the display by the operations of the circularly polarizing plate and the liquid crystal. In the vertical alignment type of liquid crystal display panel, the liquid crystal layer causes a retardation difference depending on an angle of viewing the liquid crystal display panel, the view angle that allows appropriate display becomes narrow.

For example, when black display is being performed by the liquid crystal molecules of which longitudinal direction is perpendicular to the main surface of the substrate, it is preferable that the black is displayed in deep black at any view angle. However, this state weakens a black-white contrast ratio when viewing the liquid crystal display panel at an oblique view angle. Further, the color liquid crystal display panel causes so-called "color changes", i.e., unintended changes in displayed color, and the monochrome liquid crystal display panel causes so-called "coloring", i.e., addition of violet to monochrome display. For optically compensating for retardation, the vertical alignment type of liquid crystal display panel is provided at a main surface of λ/4 phase difference plate 30 remote from linearly polarizing plate 32 with a C-plate 31 serving as an optical compensation film for increasing the view angle.

FIG. 29 illustrates optical characteristics of the C-plate. Assuming that the C-plate has refractivities nx and ny in the directions parallel to the main surface of the C-plate as well as a refractivity nz in the direction of thickness, the C-plate exhibits characteristics of (nx=ny>nz). The C-plate is a birefringent layer of which optical indicatrix is negative uniaxial. The values of nx and nz of the C-plate are determined according to the form or configuration of the liquid crystal molecules used therein. By overlaying the C-plate on the circularly polarizing plate, the view angle can be increased.

FIG. 30 optically illustrates a usual λ/4 phase difference plate. nx and ny represent the refractivities in the directions parallel to the main surface of the λ/4 phase difference plate, and nz represents the refractivity in the direction of thickness of the λ/4 phase difference plate. Assuming that λ/4 phase difference plate has a thickness of d, the λ/4 phase difference plate satisfies the relationship of the following equation:

$$(nx-ny) \cdot d = (1/4)\lambda \quad (1)$$

The liquid crystal display panel satisfies the relationship of (nx>ny=nz). Thus, a general λ/4 phase difference plate exhibits positive refractivity characteristics. In the λ/4 phase difference plate of the circularly polarizing plate of the liquid crystal display panel, it is preferable to use nz of a smaller value (see, e.g., Japanese Patent Laying-Open No. H11-212077).

Japanese Patent Laying-Open No. 2003-90915 has disclosed an optical compensation film having a large Nz coefficient in the λ/4 phase difference plate. It is disclosed that the Nz coefficient of the λ/4 phase difference plate is preferably in a range of more than 1.1 and not more than 3 for achieving good view angle characteristics.

In the manufacturing process of the liquid crystal display panel, liquid crystal 23 must be sealingly stored between two substrates 20 and 21 as shown in FIG. 27. For storing liquid crystal 23, a dip method or a dispenser method may be performed. In these storing or applying methods, an annular seal member having an opening is arranged on one of the substrates, and the two substrates are adhered in advance together. Then, the liquid crystal is applied through the opening, and the opening is closed. In the dip method and dispenser method, the application of the liquid crystal and the closing are performed after adhering the substrates together.

In recent years, one-drop applying method (which will also be referred to as a "drop adhering method" hereinafter") has been developed as a method of sealingly storing the liquid crystal between the two substrates. In the one-drop applying method, an annular seal member of a closed form is arranged on a main surface of one of the substrates. After applying a drop of liquid crystal to an area inside the annular seal member thus arranged, the two substrates are overlaid in a depressurized atmosphere. After adhering the two substrates, the pressure is returned to an atmospheric pressure to store the liquid crystal. In this one drop filling method, adhesion of the two substrates can be performed simultaneously with storing of the liquid crystal so that the manufacturing time can be remarkably reduced. Further, such an advantage can be achieved that a plurality of liquid crystal display units can be simultaneously formed in a grid like fashion between large substrates.

FIGS. 31 to 35 illustrate a manufacturing method of a prior art in which a circularly polarizing plate is adhered to an individual liquid crystal display panel (see Japanese Patent Laying-Open Nos. 2003-227925, 2003-232922 and 2003-57635). As shown in FIG. 31, the method prepares a λ/4 phase difference plate 35 taking a rolled form and having a lagging axis parallel to the longitudinal direction as indicated by an arrow 54, and a linearly polarizing plate 36 taking a rolled form and having an absorption axis inclined by 45° from the longitudinal direction as indicated by an arrow 55. λ/4 phase difference plate 35 and linearly polarizing plate 36 are arranged such that the longitudinal directions thereof are parallel to each other.

Then, as shown in FIG. 32, λ/4 phase difference plate 35 and linearly polarizing plate 36 are adhered together with their longitudinal direction parallel to each other. An optical film, i.e., a circularly polarizing plate 39 is formed by the adhesion, and is wound into a roll form again.

As shown in FIG. 33, a rectangle defined by a cutting frame 41 is cut off from circularly polarizing plate 39. One side of the rectangle thus cut is parallel to the longitudinal direction of circularly polarizing plate 39. This cutting step is generally performed such that circularly polarizing plates of a plurality of liquid crystal display units can be cut off later.

As shown in FIG. 34, portions each required for an individual liquid crystal display unit are cut off along cutting frames 42 from the circularly polarizing plate previously cut off.

As shown in FIG. 35, circularly polarizing plate 39 is finally adhered to a main surface of an individual liquid crystal display unit 10. In this case, the main surface of individual liquid crystal display unit 10 is adhered to the main surface of circularly polarizing plate 39 provided by the λ/4 phase difference plate as indicated by an arrow 61.

Patent Document 1: Japanese Patent Laying-Open No. 2003-121642

Patent Document 2: Japanese Patent Laying-Open No. H11-212077

Patent Document 3: Japanese Patent Laying-Open No. 2003-90915

Patent Document 4: Japanese Patent Laying-Open No. 2003-227925

Patent Document 5: Japanese Patent Laying-Open No. 2003-232922

Patent Document 6: Japanese Patent Laying-Open No. 2003-57635

DISCLOSURE OF THE INVENTION

Problems to be Solved by the Invention

In the vertical alignment type of liquid crystal display panel, the view angle characteristics can be improved by overlaying the C-plate on the λ/4 phase difference plate as shown in FIG. 28. However, the circularly polarizing plate is formed of many, i.e., four layers. Therefore, it has been desired to provide a circularly polarizing plate formed of fewer layers while maintaining good view angle characteristics so that it becomes possible to provide an inexpensive circularly polarizing plate by improving productivity.

The manufacturing method shown in FIGS. 31 to 35 can reduce a portion left after cutting off the circularly polarizing plates. Thus, the circularly polarizing plates can be cut off with high cut-off efficiency. In this case, the lagging axis of the λ/4 phase difference plate is parallel to one side of the cut-off rectangular portion. However, this direction of the lagging axis is not necessarily preferable when consideration is given to the direction that increases the view angle of the liquid crystal display panel thus manufactured. In the step of FIG. 33, cutting may be performed such that the rectangle of cutting frame 41 is inclined with respect to the longitudinal direction of circularly polarizing plate 39.

For example, in many monochrome liquid crystal display panels, the display region is rectangular, and it is desired that the black and low contrast ratio is large in the directions parallel and perpendicular to one of this rectangular region. In some cases, however, the direction providing a large view angle is neither perpendicular nor parallel to the direction of the lagging axis of the λ/4 phase difference plate. Therefore, when cutting is performed such that the longitudinal direction of the circularly polarizing plate is parallel to one side of the cut-off rectangle as shown in FIG. 33, this causes a problem that the direction providing a large view angle is inclined with respect to one side of the rectangular display region. In the step shown in FIG. 33, therefore, the rectangular circularly polarizing plate must be cut off in an inclined fashion, which results in a problem of increase of left portions.

In the conventional method of manufacturing the liquid crystal display panel, the circularly polarizing plates are adhered to the respective individual liquid crystal display units one by one, resulting in a problem of low productivity.

An object of the invention is to provide a circularly polarizing plate having good view angle characteristics, a vertical alignment type of liquid crystal display panel provided with the circularly polarizing plate as well as a method of manufacturing them.

Means for Solving the Problems

In a first aspect of a circularly polarizing plate according to the invention, the circularly polarizing plate includes a λ/4 phase difference plate, and a linearly polarizing plate having an absorption axis forming an angle of about 45° with respect to a lagging axis of the λ/4 phase difference plate and overlaid on a main surface of the λ/4 phase difference plate. The λ/4 phase difference plate has reverse wavelength dispersion characteristics, and has an Nz coefficient of 1.6 or more. Employment of this structure can provide the circularly polarizing plate achieving good view angle characteristics in a vertical alignment type of liquid crystal display panel. Further, the number of layers in the circularly polarizing plate can be reduced, and this improves the productivity.

Preferably, in the above invention, the λ/4 phase difference plate has the Nz coefficient from 2.5 to 3.0. Employment of this structure can further improve the view angle characteristics.

Preferably, in the above invention, the circularly polarizing plate has a substantially rectangular plane form, the lagging axis forms an angle of about +80° with respect to a reference direction parallel to one side of the substantially rectangular form, and the absorption axis forms an angle of about +35° with respect to the reference direction. Alternatively, the circularly polarizing plate has a substantially rectangular plane form, the lagging axis forms an angle of about −20° with respect to the reference direction parallel to one side of the substantially rectangular form, and the absorption axis forms an angle of about +25° with respect to the reference direction. Employment of these structures enables efficient production of the liquid crystal display panel having the substantially rectangular plane form. Further, in the liquid crystal display panel having the substantially rectangular plane form, a direction providing a wide view angle can be parallel or perpendicular to the direction of one side of the substantial rectangle.

In the above invention, the circularly polarizing plate preferably takes a rolled form. Employment of this structure enables rapid production of a large quantity of circularly polarizing plates, and thus improves productivity. It is possible to reduce a volume of a large quantity of circularly polarizing plates, which facilitates handling and transportation thereof.

Preferably, in the above invention, the lagging axis forms an angle of about +80° with respect to the reference direction defined by a longitudinal direction, and the absorption axis forms an angle of about +35° with respect to the reference direction. Alternatively, the lagging axis forms an angle of about −20° with respect to the reference direction defined by a longitudinal direction, and the absorption axis forms an angle of about +25° with respect to the reference direction. Employment of these structures can reduce an amount of left portions of the circularly polarizing plate after the cutting. Further, in the liquid crystal display panel having the substantially rectangular plane form, a direction providing a wide view angle can be parallel to the direction of one side of the substantial rectangle.

In a first aspect of a liquid crystal display panel according to the invention, a vertical alignment type of liquid crystal display panel includes the foregoing circularly polarizing plate. Employment of this structure can provide the liquid crystal display panel having good view angle characteristics and improving productivity.

In a first aspect of a method of manufacturing a circularly polarizing plate according to the invention, the method includes an adhering step of adhering a main surface of a λ/4 phase difference plate taking a rolled form and having an Nz coefficient of 1.6 or more and a main surface of a linearly polarizing plate taking a rolled form together while keeping longitudinal directions of these plates parallel to each other. The adhering step uses the λ/4 phase difference plate having a lagging axis forming an angle of about +80° with respect to the longitudinal direction, and the linearly polarizing plate having an absorption axis forming an angle of about +35° with respect to the longitudinal direction. Further, the method includes an adhering step of adhering a main surface of a λ/4 phase difference plate taking a rolled form and having an Nz coefficient of 1.6 or more and a main surface of a linearly polarizing plate taking a rolled form together while keeping longitudinal directions of these plates parallel to each other. The adhering step uses the λ/4 phase difference plate having a lagging axis forming an angle of about +25° with respect to the longitudinal direction, and the linearly polarizing plate having an absorption axis forming an angle of about −20° with respect to the longitudinal direction. By employing the above methods, it is possible to manufacture the circularly polarizing plate having good view angle characteristics. Also, it is possible to provide the method of manufacturing the circularly polarizing plate achieving good productivity.

In the invention, the method uses the λ/4 phase difference plate having reverse wavelength dispersion characteristics. By employing this method, it is possible to provide the circularly polarizing plate having good view angle characteristics In the invention, the adhering step is preferably performed while adhering a transparent protection plate to a main surface of the linearly polarizing plate opposite to the main surface to be adhered to the λ/4 phase difference plate. By employing this method, the circularly polarizing plate to be adhered to the liquid crystal display panel can be manufactured in one step.

In this invention, the method preferably includes a step of winding into a roll form after the adhering step. By employing this method, a large quantity of the circularly polarizing plate can be continuously manufactured.

In the invention, the method preferably includes a step of cutting off a substantially rectangular form having one side parallel to the longitudinal direction after the adhering step. Employment of this method can reduce a portion of the circularly polarizing plate left after the cutting.

In a first aspect of a method of manufacturing a liquid crystal display panel according to the invention, the method of manufacturing a vertical alignment type of liquid crystal display panel includes a circularly polarizing plate adhering step of adhering a circularly polarizing plate to a main surface of a large liquid crystal display unit base provided with a plurality of individual liquid crystal display units each having a closed space between two substrates filled with liquid crystal, and a step of cutting off the individual display units by cutting the large liquid crystal display unit base after the circularly polarizing plate adhering step. The circularly polarizing plate adhering step uses the circularly polarizing plate manufactured by the foregoing manufacturing method. By employing this method, the circularly polarizing plate can be adhered to the many individual liquid crystal display units in one step so that the productivity is improved.

In the invention, the circularly polarizing plate adhering step preferably includes a step of adhering a plurality of large liquid crystal display unit bases in the longitudinal direction of the circularly polarizing plate, and a step of cutting off the circularly polarizing plate along an outer periphery of the large liquid crystal display unit base. By employing this method, it is possible to adhere the λ/4 phase difference plate and the linearly polarizing plate together, and the circularly polarizing plate can be adhered to the large liquid crystal display unit base so that the productivity can be improved.

In a second aspect of a circularly polarizing plate according to the invention, the circularly polarizing plate includes a λ/4 phase difference plate having reverse wavelength dispersion characteristics and an Nz coefficient of 1.6 or more, and a linearly polarizing plate overlaid on a main surface of the λ/4 phase difference plate. The circularly polarizing plate has a rectangular plane form. The λ/4 phase difference plate has a lagging axis forming an angle of about +90° with respect to a reference direction parallel to one side of the rectangular form, and the linearly polarizing plate has an absorption axis forming an angle of about +45° with respect to the reference direction. By employing this structure, it is possible to provide the circularly polarizing plate having good view angle characteristics in the vertical alignment type of liquid crystal display panel. It is also possible to reduce the number of layers in the circularly polarizing plate so that the productivity is improved.

In a third aspect of a circularly polarizing plate according to the invention, the circularly polarizing plate includes a $\lambda/4$ phase difference plate having reverse wavelength dispersion characteristics and an Nz coefficient of 1.6 or more, and a linearly polarizing plate overlaid on a main surface of the $\lambda/4$ phase difference plate. The plate takes a rolled form. The $\lambda/4$ phase difference plate has a lagging axis forming an angle of about +90° with respect to a reference direction defined by a longitudinal direction, and the linearly polarizing plate has an absorption axis forming an angle of about +45° with respect to the reference direction. By employing this structure, it is possible to provide the circularly polarizing plate having good view angle characteristics in the vertical alignment type of liquid crystal display panel. It is also possible to reduce the number of layers in the circularly polarizing plate so that the productivity is improved.

Preferably, in the above invention, the $\lambda/4$ phase difference plate has the Nz coefficient from 2.5 to 3.0. Employment of this structure can further improve the view angle characteristics.

In a second aspect of a method of manufacturing a circularly polarizing plate according to the invention, a vertical alignment type of liquid crystal display panel includes the foregoing circularly polarizing plate. By employing this structure, it is possible to provide the liquid crystal display panel having good view angle characteristics and improving productivity.

In a second aspect of a method of manufacturing a circularly polarizing plate according to the invention, the method includes an adhering step of adhering a main surface of a $\lambda/4$ phase difference plate taking a rolled form and having an Nz coefficient of 1.6 or more and a main surface of a linearly polarizing plate taking a rolled form together while keeping longitudinal directions of these plates parallel to each other. The adhering step uses the $\lambda/4$ phase difference plate having a lagging axis forming an angle of about +90° with respect to the longitudinal direction, and the linearly polarizing plate having an absorption axis forming an angle of about +45° with respect to the longitudinal direction. By employing the above methods, it is possible to manufacture the circularly polarizing plate having good view angle characteristics. Also, it is possible to provide the method of manufacturing the circularly polarizing plate achieving good productivity.

In the invention, the $\lambda/4$ phase difference plate preferably has reverse wavelength dispersion characteristics. Employment of this method can further improve the view angle characteristics.

In the invention, the adhering step is preferably performed while adhering a transparent protection plate to a main surface of the linearly polarizing plate opposite to the main surface to be adhered to the $\lambda/4$ phase difference plate. By employing this method, the circularly polarizing plate to be adhered to the liquid crystal display panel can be manufactured in one step.

In this invention, the method preferably includes a step of winding into a roll form after the adhering step. By employing this method, a large quantity of the circularly polarizing plate can be continuously manufactured.

In the invention, the method preferably includes a step of cutting off a rectangular form having one side inclined with respect to the longitudinal direction after the adhering step. Employment of this method can increase the view angle with respect to a direction parallel or perpendicular to one side of the rectangular form.

In a second aspect of a method of manufacturing a liquid crystal display panel according to the invention, the method of manufacturing a vertical alignment type of liquid crystal display panel includes a circularly polarizing plate adhering step of adhering a circularly polarizing plate to a main surface of a large liquid crystal display unit base provided with a plurality of individual liquid crystal display units each having a closed space between two substrates filled with liquid crystal, and a step of cutting off the individual display units by cutting the large liquid crystal display unit base after the circularly polarizing plate adhering step. By employing this method, the circularly polarizing plate can be adhered to the many individual liquid crystal display units in one step so that the productivity is improved.

In the invention, the circularly polarizing plate adhering step preferably uses the circularly polarizing plate manufactured by the foregoing manufacturing method. By employing this method, the circularly polarizing plate having good view angle characteristics can be manufactured efficiently.

EFFECTS OF THE INVENTION

The invention can provide the circularly polarizing plate and the vertical alignment type of liquid crystal display panel achieving good view angle characteristics as well as the method of manufacturing them. In particular, the invention can provide the circularly polarizing plate, the vertical alignment type of liquid crystal display panel and the method of manufacturing them that can achieve good productivity.

DESCRIPTION OF THE REFERENCE SIGNS 1, 3, 5, 7, 30, 35, 37: λ/4 phase difference plate, 2, 4, 6, 8, 32, 36, 38, 49: linearly polarizing plate, 9, 33: transparent protection plate, 10: individual liquid crystal display unit, 11: large liquid crystal display unit base, 15, 39: circularly polarizing plate, 20, 21: substrate, 22: seal member, 23: liquid crystal, 24, 25: electrode, 31: C-plate, 40, 41, 42: cutting frame, 50, 52, 54, 58: arrow (indicating a direction of a lagging axis), 51, 53, 55, 59: arrow (indicating a direction of an absorption axis), 57: arrow (indicating a reference direction), 60, 61, 65, 66, 67, 68, 69: arrow, 70: cut line, 101, 107, 137: λ/4 phase difference plate, 102, 108, 138: linearly polarizing plate, 115: circularly polarizing plate, 140: cutting frame, 150, 158: arrow (indicating a direction of a lagging axis), 151, 159: arrow (indicating a direction of an absorption axis), 160, 169: arrow

BEST MODES FOR CARRYING OUT THE INVENTION

First Embodiment

Figure 27:
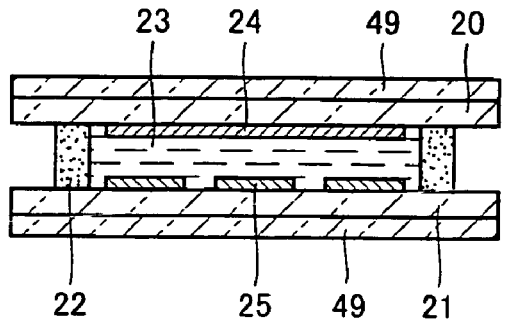
FIG. 27 is a schematic cross section illustrating a structure of the liquid crystal display panel.
Figure 28:
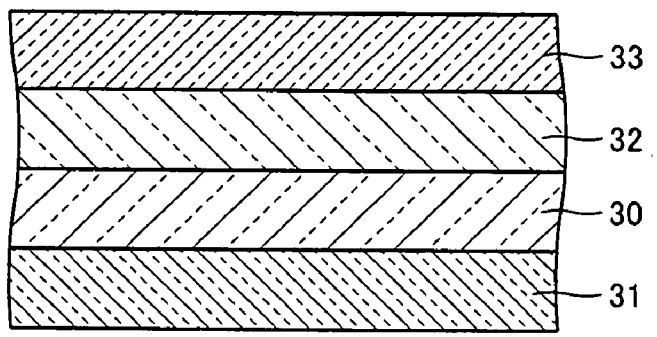
FIG. 28 is a schematic cross section of a circularly polarizing plate according to a prior art.
Figure 29:
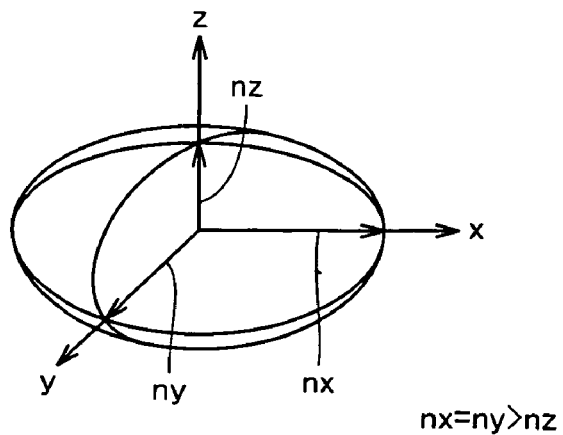
FIG. 29 illustrates optical characteristics of a C-plate.

Referring to FIGS. 1 to 8B, description will now be given on a circularly polarizing plate and a vertical alignment type of liquid crystal display panel of a first embodiment according to the invention. A single or individual liquid crystal display unit included in a liquid crystal display panel of this embodiment is substantially the same as the individual liquid crystal display unit shown in FIG. 27. Thus, liquid crystal 23 fills a space surrounded by a substrate 20 on the display side, a substrate 21 on the opposite side and a seal member 22. Substrate 20 is provided with electrodes 24, and substrate 21 is provided with electrodes 25.

For example, when the liquid crystal display panel is a color liquid crystal display panel, one of the substrates (i.e., substrate 20) is e.g., a so-called color filter substrate. The color filter substrate is provided with a color filter layer (not shown) having hues of RGB. Electrode 24 is a transparent electrode made of, e.g., ITO (Indium Tin Oxide). An alignment film (not shown) that is made of polyimide and is subjected to rubbing processing is arranged inside the transparent electrodes. The other substrate 21 is, e.g., a so-called TFT (Thin Film Transistor) substrate. The TFT substrate includes a plurality of gate bus lines each extending in one direction, a plurality of source bus lines crossing the gate bus lines and TFTs arranged near the crossing points of the gate and source bus lines. As electrodes 25, transparent electrodes are formed when the liquid crystal display panel is of the transparent type, and reflection electrodes are formed when the liquid crystal display panel is of the reflection type. Both the transparent and reflection electrodes are formed when the liquid crystal display panel is of the semitransparent type. Electrodes 25 are connected to the source bus lines, and are arranged in a grid like fashion. A liquid crystal alignment film (not shown) is formed inside electrodes 25. Spacers (not shown) keep a constant distance between two substrates 20 and 21.

The liquid crystal display panel of this embodiment is of the vertical alignment type. This liquid crystal display panel employs the circularly polarizing plate formed of the linearly polarizing plate and the λ/4 phase difference plate adhered together. The circularly polarizing plate has a function of circularly polarizing incident light. The circular polarization mode is suitable for the reflection type of liquid crystal display panel and the semitransparent type of liquid crystal display panel.

Figure 1:
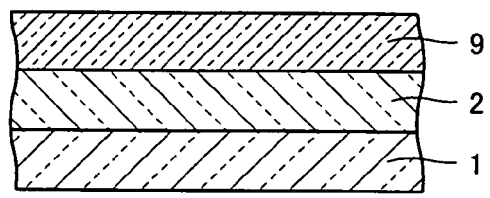
FIG. 1 is a schematic cross section of a circularly polarizing plate of a first embodiment according to the invention.

FIG. 1 is a schematic cross section of one circularly polarizing plate of the embodiment. This circularly polarizing plate is formed of three layers, i.e., a λ/4 phase difference plate 1, a linearly polarizing plate 2 overlaid on a main surface of λ/4 phase difference plate 1 and having an absorption axis that forms about 45° with respect to a lagging axis of λ/4 phase difference plate 1, and a transparent protection plate 9. Transparent protection plate 9 is employed for protecting linearly polarizing plate 2 from moisture and the like.

Figure 2:
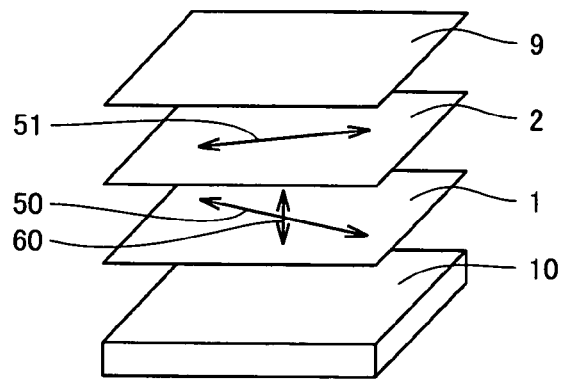
FIG. 2 is a schematic perspective view showing a structure of a reflection type of liquid crystal display panel of the first embodiment according to the invention.

As shown in FIG. 2, the liquid crystal display panel according to the invention has a structure in which the circularly polarizing plate according to the invention is adhered to a main surface of an individual liquid crystal display unit 10. λ/4 phase difference plate 1 is in contact with and is adhered to the main surface of the substrate of individual liquid crystal display unit 10. FIG. 2 shows an example of a reflection type of liquid crystal display panel, in which the circularly polarizing plate is adhered to one of the two substrates. In FIG. 2, the circularly polarizing plate is directly adhered to the main surface of the substrate, but may be adhered in another manner, and another optical compensation film or the like may be interposed between those adhered together.

An arrow 50 on λ/4 phase difference plate 1 indicates a direction of the lagging axis, and an arrow 51 on linearly polarizing plate 2 indicates a direction of the absorption axis. λ/4 phase difference plate 1 and linearly polarizing plate 2 are adhered together such that the directions of the lagging axis and the absorption axis form an angle of about 45° therebetween.

Figure 3A:
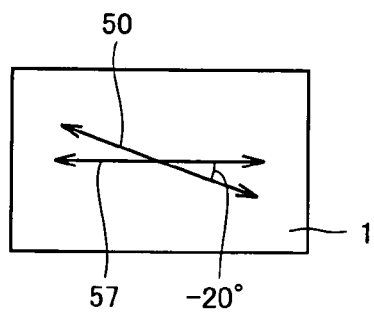
FIG. 3A is a plan illustrating a $\lambda/4$ phase difference plate included in one circularly polarizing plate of the first embodiment according to the invention.
Figure 3B:
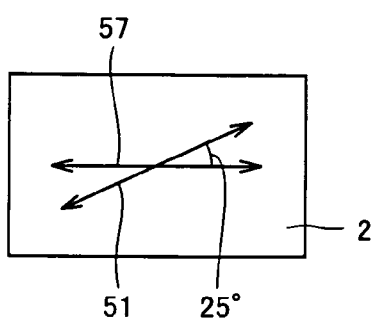
FIG. 3B is a plan illustrating a linearly polarizing plate included in one circularly polarizing plate of the first embodiment according to the invention.

FIGS. 3A and 3B are plans of λ/4 phase difference plate 1 and linearly polarizing plate 2, respectively. Each of λ/4 phase difference plate 1 and linearly polarizing plate 2 has a rectangular plane form. An arrow 57 indicates a reference direction. In this embodiment, the reference direction is parallel to one side of the rectangle of the plane form of the circularly polarizing plate. As shown in FIG. 3A, the direction indicated by arrow 50 of the lagging axis of λ/4 phase difference plate 1 forms an inclination angle of about −20° with respect to the reference direction indicated by arrow 57. As shown in FIG. 3B, the direction indicated by arrow 51 of the absorption axis of linearly polarizing plate 2 forms an inclination angle of about +25° with respect to the reference direction indicated by arrow 57.

Figure 4:
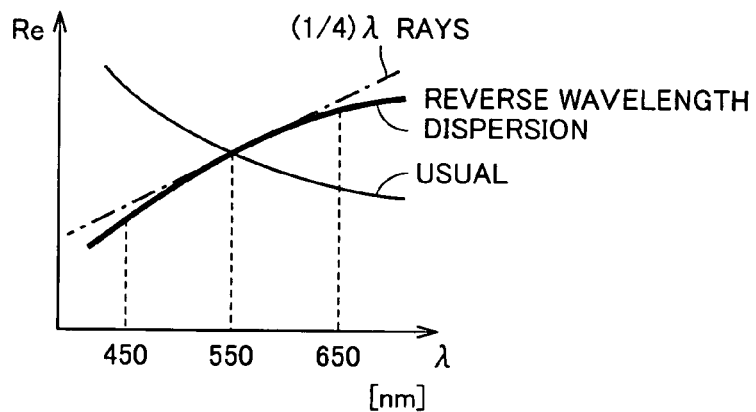
FIG. 4 illustrates optical characteristics of the $\lambda/4$ phase difference plate used in the invention.

The λ/4 phase difference plate employed in the circularly polarizing plate according to the invention has reverse wavelength dispersion characteristics. FIG. 4 is a graph illustrating the reverse wavelength dispersion characteristics. The abscissa gives a wavelength of light, and the ordinate gives Re (Retardation), which is represented by the following equation:

$$Re = (ne - no) \cdot d \quad (2)$$

where ne represents a refractivity with respect to an abnormal light beam, and no represents a refractivity with respect to a normal light beam. d represents a thickness of the λ/4 phase difference plate. Re represents a magnitude of a phase difference or a magnitude of a phase lag.

A usual λ/4 phase difference plate has such characteristics that Re monotonously decreases with increase in wavelength. The usual λ/4 phase difference plate exhibits so-called positive dispersion characteristics. Conversely, the λ/4 phase difference plate exhibiting the reverse wavelength dispersion characteristics exhibits such characteristics that Re monotonously increases with increase in wavelength. The film exhibiting the reverse dispersion characteristics may be, e.g., a WRF (R) (Wideband Retardation Film) (see Japanese Patent Laying-Open No. 2000-137116).

Figure 5:
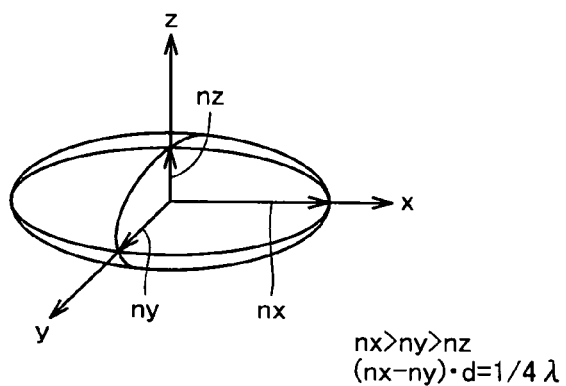
FIG. 5 illustrates optical characteristics of the $\lambda/4$ phase difference plate used in the invention.

This embodiment employs the λ/4 phase difference plate having the Nz coefficient of 1.6 or more. The Nz coefficient is represented by the following equation:

$$Nz = (nx - nz)/(nx - ny) \quad (3)$$

where nx is a refractivity in the direction of the lagging axis, ny is a refractivity in the direction perpendicular to the lagging axis and nz is a refractivity in the direction of thickness. FIG. 5 illustrates a relationship between nx, ny and nz determining the Nz coefficient of the λ/4 phase difference plate of this embodiment. The following relationship is present between nx, ny and nz:

$$nx > ny > nz \quad (4)$$

Figure 30:
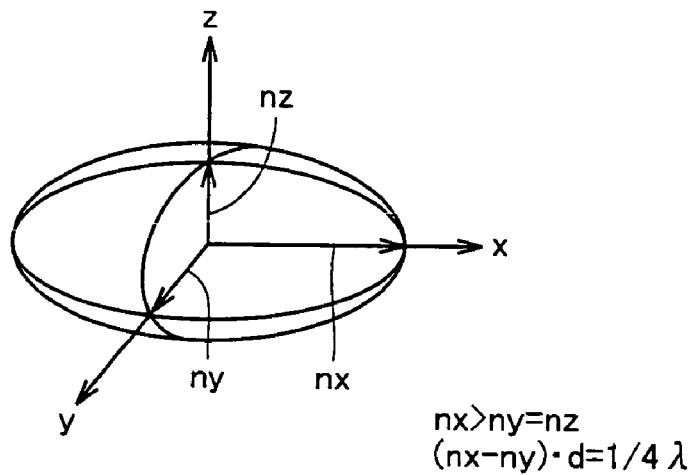
FIG. 30 illustrates optical characteristics of a λ/4 phase difference plate used in a vertical alignment type of liquid crystal display panel of the prior art.
Figure 31:
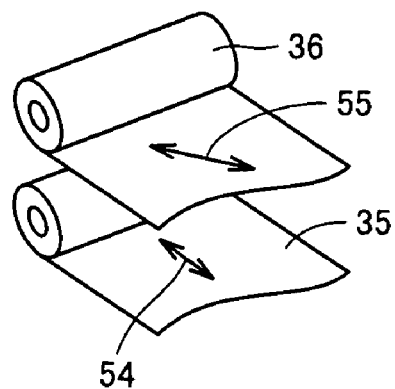
FIG. 31 illustrates a first step in a method of manufacturing the circularly polarizing plate according to the prior art.
Figure 32:
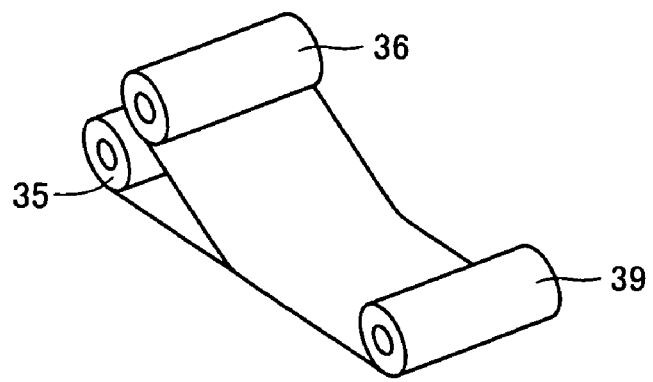
FIG. 32 illustrates a second step in the method of manufacturing the circularly polarizing plate according to the prior art.
Figure 33:
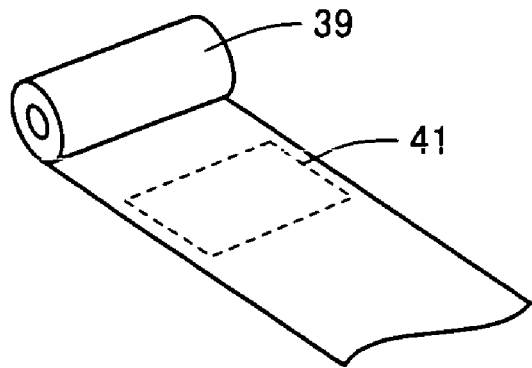
FIG. 33 illustrates a third step in the method of manufacturing the circularly polarizing plate according to the prior art.
Figure 34:
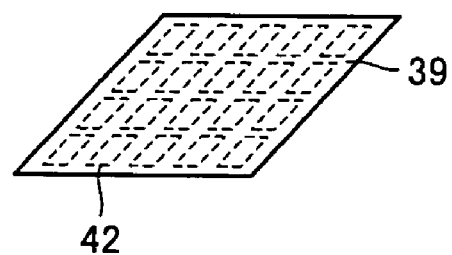
FIG. 34 illustrates a fourth step in the method of manufacturing the circularly polarizing plate according to the prior art.
Figure 35:
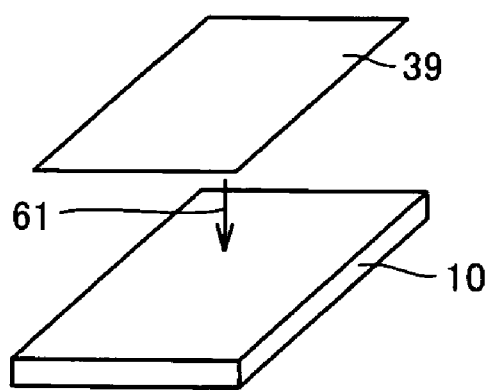
FIG. 35 illustrates the method of manufacturing the liquid crystal display panel according to the prior art.

As illustrated in FIG. 30, the λ/4 wavelength plate in the prior art has characteristics of uniaxial alignment exhibiting a relationship of (ny=nz), but the λ/4 wavelength plate used in the invention has characteristics of biaxial alignment exhibiting a relationship of (ny>nz). As indicated by an arrow 60 in FIG. 2, λ/4 phase difference plate 1 also has optical characteristics in the direction perpendicular to the display surface of individual liquid crystal display unit 10.

Transparent protection plate 9 can be, e.g., a TAC (Tri-Acetyl Cellulose) film having a high optical transmissivity. The circularly polarizing plate according to the invention can be effectively used in the vertical alignment type of liquid crystal display panel.

Figure 6A:
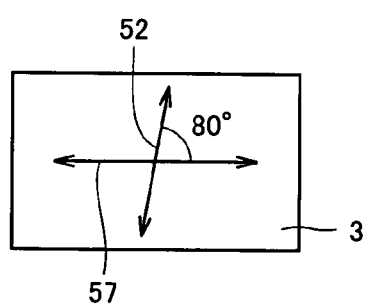
FIG. 6A is a plan illustrating a $\lambda/4$ phase difference plate included in another circularly polarizing plate of the first embodiment according to the invention.
Figure 6B:
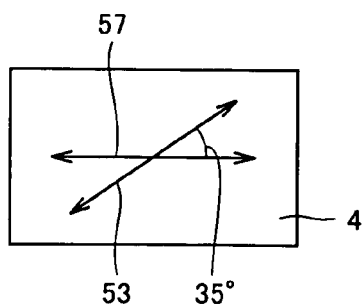
FIG. 6B is a plan illustrating a linearly polarizing plate included in another circularly polarizing plate of the first embodiment according to the invention.

FIGS. 6A and 6B illustrate another circularly polarizing plate of the embodiment. This circularly polarizing plate of the embodiment differs from the foregoing circularly polarizing plate in directions of the lagging axis of the λ/4 phase difference plate and the absorption axis of the linearly polarizing plate. FIG. 6A is a plan of the λ/4 phase difference plate, and FIG. 6B is a plan of the linearly polarizing plate. Each of λ/4 phase difference plate 3 and linearly polarizing plate 4 has a rectangular form in a plan view. The reference direction of each of λ/4 phase difference plate 3 and linearly polarizing plate 4 indicated by arrow 57 is parallel to one side of the rectangular plane form. λ/4 phase difference plate 3 has the lagging axis forming an inclination angle of 80° with respect to the reference direction. Linearly polarizing plate 4 has the absorption axis in the direction indicated by arrow 53 and forming an inclination angle of 35° with respect to the reference direction. Structures other than the above are substantially the same as those of the circularly polarizing plate shown in FIGS. 3A and 3B.

Figure 7:
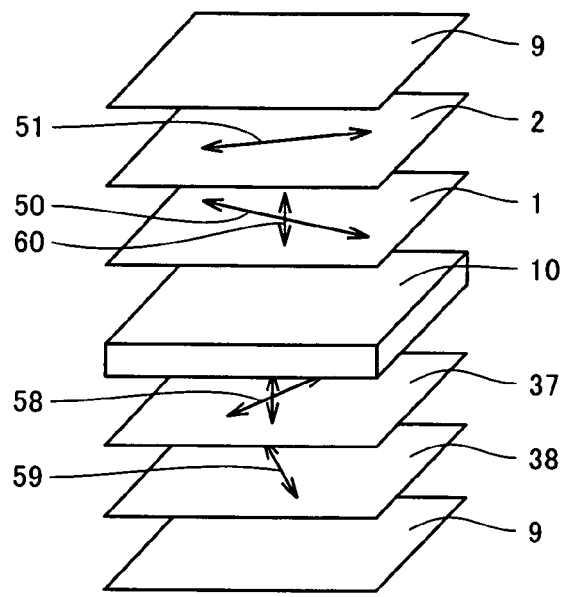
FIG. 7 is a schematic perspective view showing a structure of a transparent or semitransparent type of liquid crystal display panel of the first embodiment according to the invention.

The description has been primarily given on the reflection type of liquid crystal display panel. However, when the liquid crystal display panel is of the transparent type or semitransparent type, the circularly polarizing plates are adhered to both the substrates. FIG. 7 is a schematic perspective view showing a structure of the transparent or semitransparent type of liquid crystal display panel. For employing the circularly polarizing plate provided with the λ/4 phase difference plate and the linearly polarizing plate shown in FIGS. 3A and 3B or FIGS. 6A and 6B in the transparent or semitransparent type of liquid crystal display panel, the circularly polarizing plates are attached to both the main surfaces of the two substrates.

FIG. 7 illustrates a case in which the circularly polarizing plate having the structure shown in FIGS. 3A and 3B is adhered to one of the substrates. In this liquid crystal display panel, λ/4 phase difference plates 1 and 37 adhered to each of the two substrates have the lagging axes of which directions indicated by arrows 50 and 58 form of an angle of 90°, respectively. Likewise, linearly polarizing plates 2 and 38 are attached such that the absorption axes in the directions indicated by arrows 51 and 59 form an angle of 90°. As shown in FIG. 7, when the circularly polarizing plate adhered to one of the substrates is provided with the λ/4 phase difference plate and the linearly polarizing plate, the circularly polarizing plate adhered to the other substrate has such structures that the lagging axis forms an angle of +70° with respect to the reference direction when viewed from the side of the λ/4 phase difference plate (i.e., when viewed downward from the upper side of the sheet of FIG. 7) and the absorption axis forms an angle of −65° with respect to the reference direction.

When the circularly polarizing plate is provided with the λ/4 phase difference plates and the linearly polarizing plates shown in FIGS. 6A and 6B, a circularly polarizing plates with logging axes forming an angle of 90° therebetween and with absorption axes forming an angle of 90° therebetween is adhered to the other substrate.

In the vertical alignment type of liquid crystal display panel of this embodiment, the Nz coefficient of the λ/4 phase difference plate is 1.6 or more. By employing this structure, the λ/4 phase difference plate can have the function of optical compensation of a conventional C-plate. In the vertical alignment type of liquid crystal display panel, therefore, it is possible to prevent tinting and color change, which may occur when viewing the liquid crystal display panel in an inclined position, without using a C-plate. More specifically, the view angle can be increased without using the optical compensation film such as a C-plate, and the required circularly polarizing plates can reduced in number from at least four to at least three. As described above, the circularly polarizing plates according to the invention can reduce the required number of the circularly polarizing plate layers without deteriorating the view angle characteristics.

Further, the preferable Nz coefficient for sufficiently increasing the view angle is in a range of not less than 2.5 and not more than 3.0. Employment of this structure can offer remarkable effects in the vertical alignment type of liquid crystal display panel exhibiting a liquid crystal difference dn (i.e., a coefficient expressed by (ne−no)·d) in a range from 320 nm or 420 nm.

Although this embodiment does not use the optical compensation plate such as a C-plate, the optical compensation plate may be additionally adhered to the λ/4 phase difference plate for increasing the effect of optical compensation. In this case, it is preferable that a sum of values of Rth of the λ/4 phase difference plate and the optical compensation plate satisfies a relationship of (130 nm≦Rth≦210 nm), where Rth is expressed by the following equation:

$$Rth = (nx+ny)/2 - nz \quad (5)$$

Figure 8A:
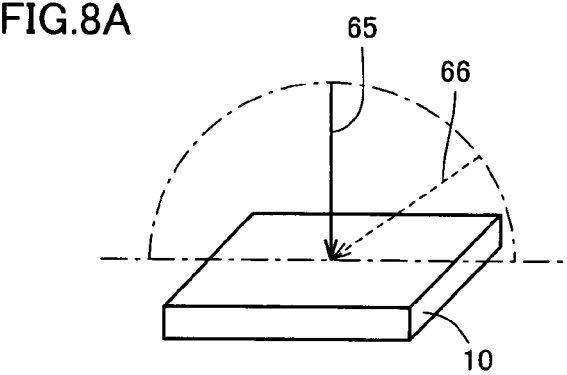
FIG. 8A is a first view illustrating a preferable direction increasing a view angle.
Figure 8B:
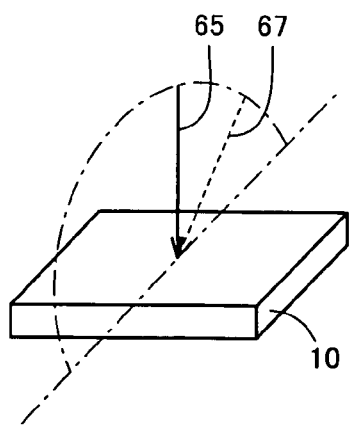
FIG. 8B is a second view illustrating the preferable direction increasing the view angle.

FIGS. 8A and 8B illustrate effects of the circularly polarizing plate according to the invention. One of the circularly polarizing plates has the lagging axis inclined by about −20° from a reference direction which is parallel to one side of a rectangle of the display region, and also has the absorption axis inclined by about +25° from the reference direction. The other circularly polarizing plate has the lagging axis inclined by about +80° from the reference direction, and also has the absorption axis inclined by about +35° from the reference direction. Employment of this structure can increase the contrast ratio when viewed, e.g., in the direction of an arrow 65 or 66 in FIG. 8A. Thus, the view angle can be increased in the direction parallel to one side of the rectangle of the main surface of the liquid crystal display panel. The view angle can also be increased in the direction perpendicular to the above one side of the rectangle as indicated by arrow 65 or 67 in FIG. 8B. In the liquid crystal display panel having the rectangular plane form, the direction providing the wide view angle can be parallel or perpendicular to the one side of the rectangle as described above.

The λ/4 phase difference plate of the circularly polarizing plate according to the invention exhibits the reverse wavelength dispersion characteristics. In the usual λ/4 phase difference plate, as shown in FIG. 4, Re monotonously decreases with increase in wavelength. Meanwhile, (1/4)λ rays monotonously increase with increase in wavelength. Therefore, even when λ/4 phase difference plate is configured to match the retardation at one wavelength, deviation of the retardation occurs as the wavelength changes from the wavelength at which the retardation is matched and, for example, so-called color changes, i.e., display in color different from the color to be displayed occurs in a color liquid crystal display panel. However, in the λ/4 phase difference plate exhibiting the reverse wavelength dispersion, the wavelength increases, and the retardation monotonously increases so that color changes and the like can be prevented. As described above, the view angle can be increased by employing the λ/4 phase difference plate having the reverse wavelength dispersion characteristics.

In this embodiment, the reference direction is parallel to one side of the rectangle. However, another form may be employed, and the reference direction may be inclined. The circularly polarizing plate and the liquid crystal display panel according to the invention may have any plane form other than the rectangle. For example, in a wristwatch, a user views a display panel in an inclined direction, and this inclined direction (in which the user frequently views the display panel) may be the reference direction.

The circularly polarizing plate of the embodiment is used for the individual liquid crystal display unit and is rectangular, but it is preferable that the circularly polarizing plate takes the rolled form, e.g., when a large quantity of the circularly polarizing plate is to be transported. Employment of this structure can reduce a volume of the circularly polarizing plate, and can facilitate dealing and transportation.

Although the reflection type of liquid crystal display panel achieves the above operations and effects, operations and effects similar to those can be achieved by the transparent type and semitransparent type of liquid crystal display panels each of which is provided on both the substrates with the circularly polarizing plates according to the invention.

Figure 9:
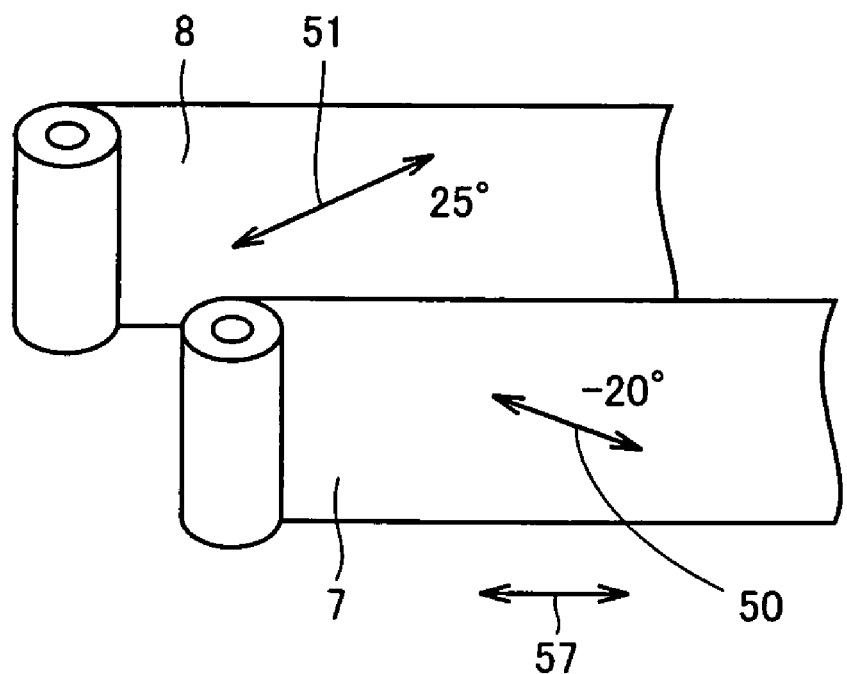
FIG. 9 illustrates one λ/4 phase difference plate in a rolled form and one linearly polarizing plate in a rolled form used in a manufacturing method of the first embodiment according to the invention.

Referring to FIGS. 9-16, description will now be given on a method of manufacturing the circularly polarizing plate of the embodiment and a method of manufacturing the liquid crystal display panel. As shown in FIG. 9, a λ/4 phase difference plate 7 that takes the rolled form and has the Nz coefficient of 1.6 or more is prepared. The reference direction indicated by arrow 57 is parallel to the longitudinal direction of λ/4 phase difference plate 7 or linearly polarizing plate 8 taking the rolled form. λ/4 phase difference plate 7 has the lagging axis in the direction inclined by about −20° as indicated by arrow 50 from the reference direction indicated by arrow 57. This phase difference plate can be formed by the method disclosed, e.g., in Japanese Patent Laying-Open No. 2000-9912. Linearly polarizing plate 8 has the absorption axis inclined by about +25° as indicated by arrow 51 from the reference direction indicated by arrow 57. This linearly polarizing plate can be formed by the method disclosed, e.g., in Japanese Patent Laying-Open No. 2003-227925.

Figure 10:
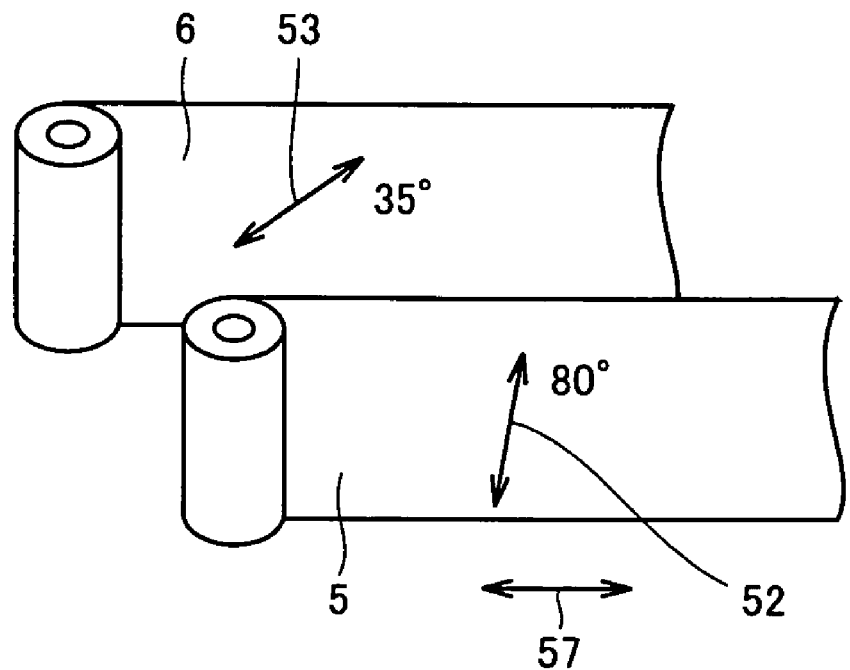
FIG. 10 illustrates another λ/4 phase difference plate in a rolled form and another linearly polarizing plate in a rolled form used in the manufacturing method of the first embodiment according to the invention.

As shown in FIG. 10, λ/4 phase difference plate 5 that has the lagging axis in the direction inclined by about +80° as indicated by an arrow 52 from the reference direction is prepared. Also, linearly polarizing plate 6 that has the absorption axis in the direction inclined by about +35° as indicated by arrow 53 from the reference direction is prepared. The following description will be given on the process of manufacturing the circularly polarizing plate and the liquid crystal display panel using the λ/4 phase difference plate and the linearly polarizing plate shown in FIG. 9, similar structures can be manufactured by using the λ/4 phase difference plate and the linearly polarizing plate shown in FIG. 10.

Figure 11:
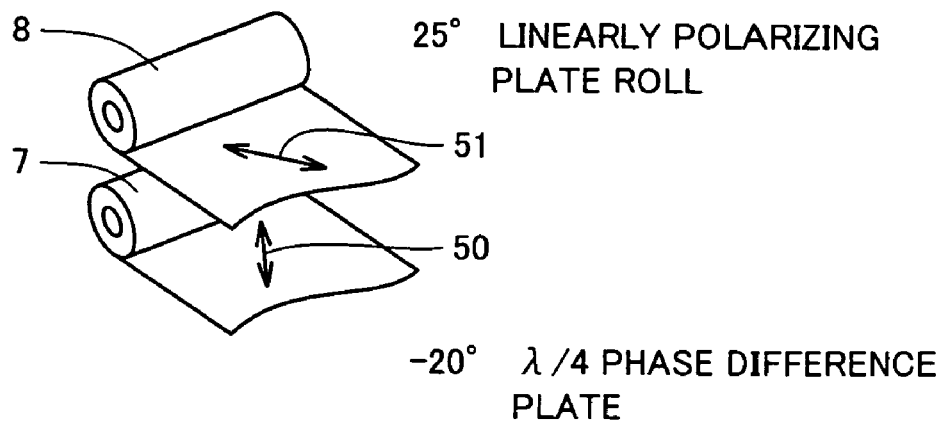
FIG. 11 illustrates a first step in the method of manufacturing the circularly polarizing plate of the first embodiment according to the invention.
Figure 12:
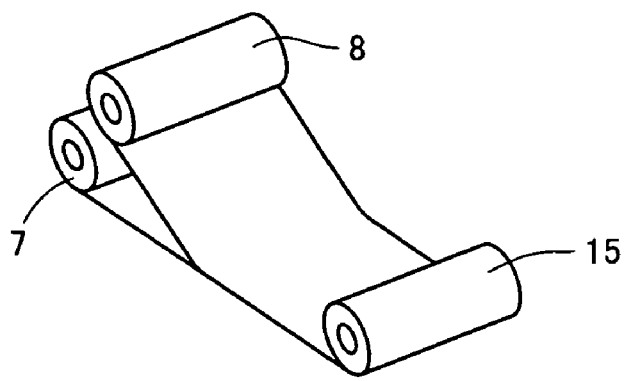
FIG. 12 illustrates a second step in the method of manufacturing the circularly polarizing plate of the first embodiment according to the invention.

First, λ/4 phase difference plate 7 and linearly polarizing plate 8 are arranged with their longitudinal directions parallel to each other as shown in FIG. 11 As shown in FIG. 12, the main surfaces of λ/4 phase difference plate 7 and linearly polarizing plate 8 are adhered together while keeping the parallel relationship between their longitudinal directions, and thus the adhering process is performed to form the circularly polarizing plate. As shown in FIG. 12, a circularly polarizing plate 15 formed after the adhering step is wound into a roll form.

Figure 13:
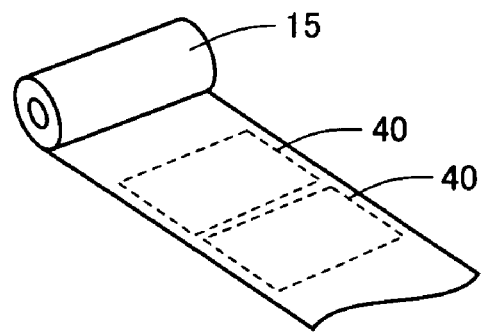
FIG. 13 illustrates a third step in the method of manufacturing the circularly polarizing plate of the first embodiment according to the invention.

As shown in FIG. 13, rectangular portions indicated by cutting frames 40 are then cut off from circularly polarizing plate 15 wound into the roll form, This cutting is performed such that one side of each rectangular portion is parallel to the longitudinal direction of the circularly polarizing plate.

Figure 14:
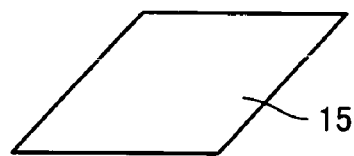
FIG. 14 is a perspective view of the circularly polarizing plate manufactured by the manufacturing method of the first embodiment according to the invention.

FIG. 14 shows the circularly polarizing plate thus cut. Circularly polarizing plate 15 prepared by the cutting may have substantially the same sizes as the main surface of the individual liquid crystal display unit, or may have substantially the same sizes as the main surface of the large liquid crystal display unit including the plurality of individual liquid crystal display units. Circularly polarizing plate 15 prepared by the cutting in this embodiment has substantially the same sizes as the main surface of the large liquid crystal display unit.

Figure 15:
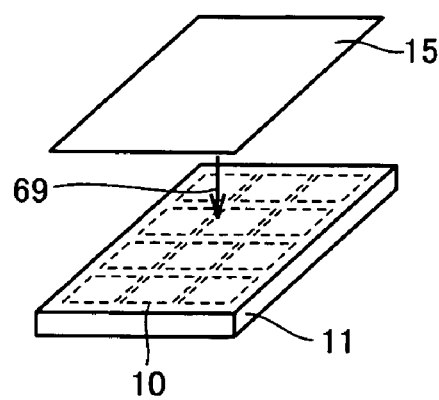
FIG. 15 illustrates a method of manufacturing the liquid crystal display panel of the first embodiment according to the invention.

FIG. 15 illustrates a step of adhering the circularly polarizing plate. As indicated by an arrow 69, circularly polarizing plate 15 prepared by the cutting is adhered to the main surface of large liquid crystal display unit base 11. This adhesion is performed by locating the λ/4 phase difference plate on the substrate side. In the case of the transparent or semitransparent type of liquid crystal display panel, the circularly polarizing plates according to the invention are adhered to the two substrates, respectively. In this case, the circularly polarizing plates are manufactured such that an angle of 90° may be formed by the lagging axes of the λ/4 phase difference plates adhered to the respective substrates, and an angle of 90° may be formed by the absorption axes of the linearly polarizing plates adhered to the respective substrates. For example, when the circularly polarizing plate having the λ/4 phase difference plate and the linearly polarizing plate shown in FIG. 9 is to be adhered to one of the substrates, the circularly polarizing plate to be adhered to the other substrate is manufactured in a similar manufacturing method by using the λ/4 phase difference plate having the lagging axis inclined by an angle of −70° from the longitudinal direction indicated by arrow 57 (when viewed upward from the lower side of the sheet of FIG. 7) as well as the linearly polarizing plate having the absorption axis inclined by an angle of +65° from the longitudinal direction. By adhering the circularly polarizing plate thus produced to the other substrate, the lagging axes form the angle of 90°, and the absorption axes form the angle of 90°.

Large liquid crystal display unit base 11 includes a plurality of individual liquid crystal display units 10 indicated by broken line. The large liquid crystal display unit of this embodiment is produced by the drop adhering method. In the large liquid crystal display unit, liquid crystal is sealingly stored in each of individual liquid crystal display units 10. After the step of adhering the circularly polarizing plate, large liquid crystal display unit base 11 is cut along the forms of liquid crystal display units 10 to cut out individual liquid crystal display units 10.

As described above, the method includes a circularly polarizing plate adhering step of adhering the circularly polarizing plate to the main surface of the large liquid crystal display unit base provided with the plurality of individual liquid crystal display units, and a step of cutting off the liquid crystal display units by cutting the large liquid crystal display unit base after the circularly polarizing plate adhering step, and the circularly polarizing plate according to the invention is used as the above circularly polarizing plate. Thereby, it is possible to provide the liquid crystal display panel having good view angle characteristics. In contrast to the prior art, it is not necessary to adhere an independent or individual circularly polarizing plate to each individual liquid crystal display unit, and the circularly polarizing plate can be adhered to the plurality of individual liquid crystal display units at a time. Therefore, the work time required for adhering the circularly polarizing plate can be remarkably reduced to provide the manufacturing method of the liquid crystal display panel achieving good productivity.

It is preferable that the λ/4 phase difference plate is made of a film having the reverse wavelength dispersion characteristics. By employing this method, it is possible to manufacture the circularly polarizing plate and the vertical alignment type of liquid crystal display panel having further improved view angle characteristics.

In the adhering step shown in FIG. 12, the adhesion may be performed while adhering a transparent protective plate to the main surface of polarizing plate 8 opposite to the main surface to which λ/4 phase difference plate 7 is being adhered. By employing this method, the three layers can be overlaid simultaneously so that the manufacturing time can be further reduced.

As shown in FIG. 12, this embodiment includes a step of winding the produced circularly polarizing plate into the roll form after the adhering step. By employing this method, the circularly polarizing plate according to the invention can be continuously formed. Also, a large quantity of circularly polarizing plate can be a small in size, which facilitates transportation, storage, dealing and the like.

The manufacturing method of the embodiment uses the λ/4 phase difference plate and the linearly polarizing plate that have the lagging axis and the absorption axis inclined by predetermined angles as shown in FIGS. 9 and 10, respectively. Further, the method includes the step of cutting off the rectangle having one side parallel to the longitudinal direction of the circularly polarizing plate wound into the roll form. For forming the rectangle having one side parallel to the direction achieving a wide view angle, it is necessary in the prior art to cut off the rectangle inclined from the longitudinal direction of the circularly polarizing plate in the rolled form.

According to the circularly polarizing plate of the embodiment, however, it is possible to cut off the rectangle such that one side of the rectangle is parallel to the longitudinal direction of the circularly polarizing plate in the rolled form. Employment of this manufacturing method can reduce a portion left after the cutting, and the produced circularly polarizing plate can be effectively used.

Figure 16:
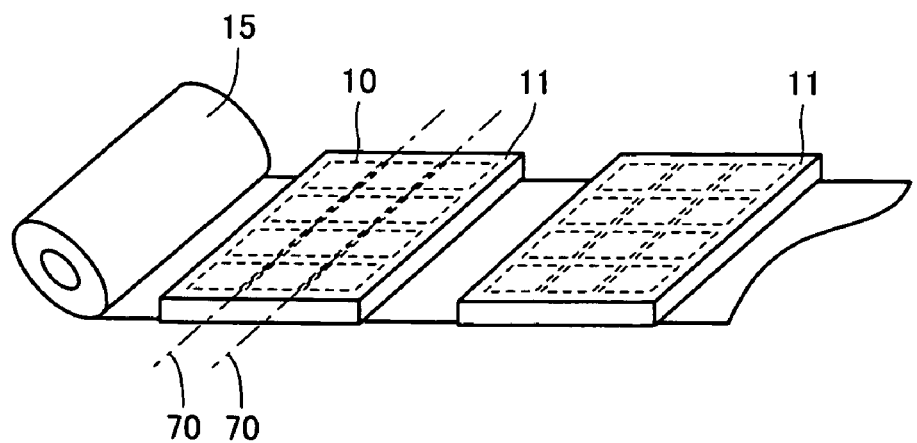
FIG. 16 illustrates another method of manufacturing the liquid crystal display panel of the first embodiment according to the invention.

In the step of adhering the circularly polarizing plate of the embodiment, the circularly polarizing plates each having the rectangular form are cut off from the circularly polarizing plate in the rolled form, and then are adhered to the large liquid crystal display unit base. However, the manner is not restricted to this, and the circularly polarizing plate adhering step may be configured to adhere continuously large liquid crystal display unit base 11 to the main surface of circularly polarizing plate 15 in the rolled form as shown in FIG. 16. This manner includes a step of cutting the circularly polarizing plate along the outer periphery of the large liquid crystal display unit base after the circularly polarizing plate adhering step of adhering the large liquid crystal display unit base and the circularly polarizing plate together. Employment of this method can further reduce the manufacturing time. As shown in FIG. 16, the method may further include a step of cutting large liquid crystal display unit base 11 and circularly polarizing plate 15 adhered to the main surface thereof along cutting lines 70, and cutting off the individual liquid crystal display units by performing cutting along cutting lines perpendicular to cutting line 70. Employment of this method can further reduce the manufacturing time.

According to the invention, the lagging axis of the λ/4 phase difference plate and the absorption axis of the linearly polarizing plate form an angle of about 45°. The "about 45°" means a range of 45±8°. The width of ±8° defines a range that can achieve the practical effect. Even in the vertical alignment type, the longitudinal direction of the liquid crystal molecules may not be completely perpendicular to the main surface of the substrate, but may be intentionally inclined by a slight angle in the manufacturing process. The above "±8°" is determined in view of the range of the angle of such inclination. For example, the alignment film having liquid crystal display molecules that are slightly inclined may be produce, e.g., for improving the productivity of the alignment film. In such a case, the lagging axis and the absorption axis may be angularly shifted within a range of ±8° in the adhering process for optically compensating for inclination of the liquid crystal molecules. In this case, perfectly circular polarizing is not performed, and elliptic polarizing is performed.

In connection with the inclination of the lagging axis of the λ/4 phase difference plate and the inclination of the absorption axis of the linearly polarizing plate in the invention, "about" means a range of ±8°. For example, the inclination of the lagging axis by "about 35°" from the reference direction means inclination by an angle in a range of +35±8°. Since the inclination of the lagging axis of the λ/4 phase difference plate is affected by the Nz coefficient of the λ/4 phase difference plate, the optimum inclination of the lagging axis must be determined according to the Nz coefficient. The range of "±8°" is a range in which the angle can be varied for determining such optimum inclination. Also, "±8°" defines the range in which the practical effect can be achieved by the circularly polarizing plate according to the invention.

Second Embodiment

Referring to FIGS. 17 to 20, description will now be given on a circularly polarizing plate and a vertical alignment type of liquid crystal display panel of a second embodiment according to the invention. An individual liquid crystal display unit included in the liquid crystal display panel of this embodiment is substantially the same as the individual liquid crystal display unit shown in FIG. 27. More specifically, liquid crystal 23 fills a space sealingly surrounded by substrate 20 on the display side, substrate 21 on the other side opposite to the display side and seal member 22. Substrate 20 is provided with electrodes 24, and substrate 21 is provided with electrodes 25.

The liquid crystal display panel of this embodiment is of the vertical alignment type. This liquid crystal display panel employs a circularly polarizing plate formed of a linearly polarizing plate and a λ/4 phase difference plate adhered together. The circularly polarizing plate has a function of circularly polarizing incident light beams. The circularly polarizing mode is suitable for the reflection type of liquid crystal display panel and the semitransparent type of liquid crystal display panel.

Figure 17:
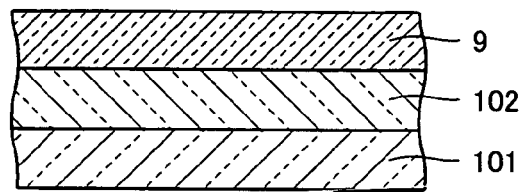
FIG. 17 is a schematic cross section of a circularly polarizing plate of a second embodiment according to the invention.

FIG. 17 shows a schematic cross section of the circularly polarizing plate of the second embodiment according to the invention. The circularly polarizing plate of the second embodiment according to the invention is formed of three layers, i.e., a λ/4 phase difference plate 101, a linearly polarizing plate 102 overlaid on the main surface of λ/4 phase difference plate 101 and having an absorption axis in a direction forming an angle of about 45° with respect to the lagging axis of λ/4 phase difference plate 101, and transparent protection plate 9. Transparent protection plate 9 is a protection film for protecting linearly polarizing plate 102 from moisture and the like.

Figure 18:
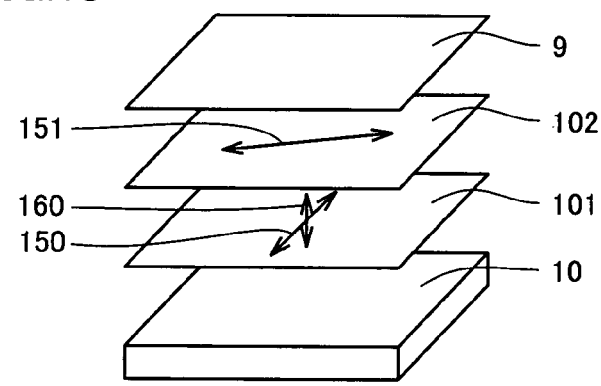
FIG. 18 is a schematic cross section of a reflection type of liquid crystal display panel of the second embodiment according to the invention.

As shown in FIG. 18, λ/4 phase difference plate 101 is in contact with the main surface of the substrate of individual liquid crystal display unit 10 and is adhered thereto. The liquid crystal display panel shown in FIG. 18 is an example of the reflection type of liquid crystal display panel, in which the circularly polarizing plate is adhered to one of the two substrates. In FIG. 18, the circularly polarizing plate is directly adhered to the main surface of the substrate. However, this manner is not restrictive, and another film such as an optical compensating film may be interposed therebetween.

In λ/4 phase difference plate 101, an arrow 150 indicates the direction of the lagging axis. In linearly polarizing plate 102, an arrow 151 indicates the direction of the absorption axis. λ/4 phase difference plate 101 and linearly polarizing plate 102 are adhered together such that a relative angle of about 45° is formed between the directions of the lagging and absorption axes.

Figure 19A:
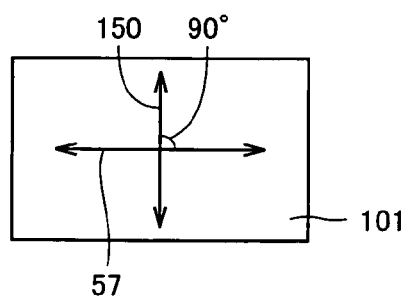
FIG. 19A is a plan illustrating a λ/4 phase difference plate included in a circularly polarizing plate of the second embodiment according to the invention.
Figure 19B:
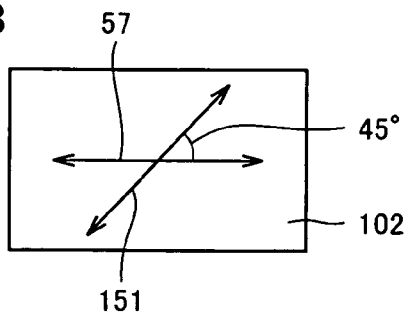
FIG. 19B is a plan illustrating a linearly polarizing plate included in the circularly polarizing plate of the second embodiment according to the invention.

FIGS. 19A and 19B are plans of λ/4 phase difference plate 101 and linearly polarizing plate 102, respectively. Each of λ/4 phase difference plate 101 and linearly polarizing plate 102 has a rectangular plane form. Arrow 57 indicates the reference direction. In this embodiment, the reference direction is parallel to one side of the rectangle that is a plane form of the circularly polarizing plate. As shown in FIG. 19A, the direction (indicated by arrow 150) of the lagging axis of λ/4 phase difference plate 101 forms an angle of about +90° with respect to the reference direction (indicated by arrow 57). As shown in FIG. 19B, the direction (indicated by arrow 151) of the absorption axis of linearly polarizing plate 102 forms an inclination angle of about +45° with respect to the reference direction (indicated by arrow 57).

The λ/4 phase difference plate employed in the circularly polarizing plate of this embodiment has the reverse wavelength dispersion characteristics. The λ/4 phase difference plate has the Nz coefficient of 1.6 or more. Further, the λ/4 wavelength plate has characteristics of biaxial alignment exhibiting a relationship of (ny>nz). More specifically, as indicated by an arrow 160 in FIG. 18, λ/4 phase difference plate 101 has optical characteristics even in the direction perpendicular to the main surface of individual liquid crystal display unit 10.

Figure 20:
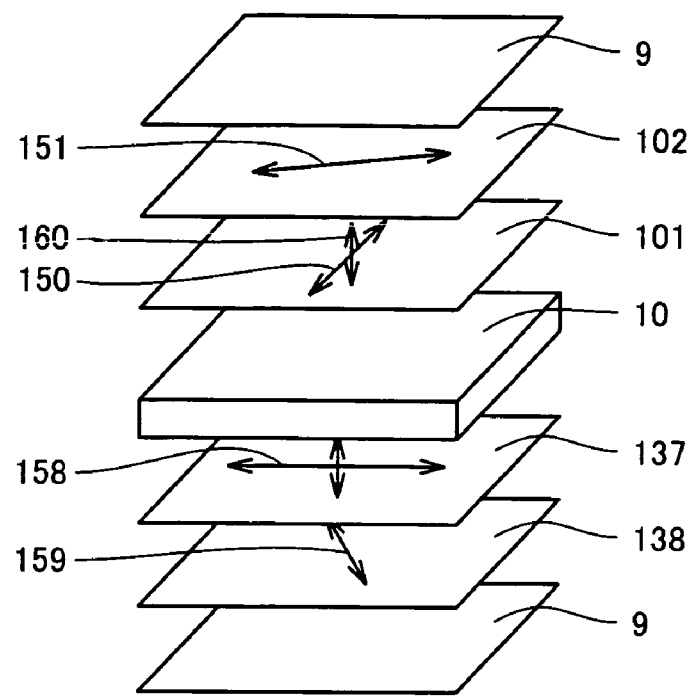
FIG. 20 is a schematic perspective view showing a structure of a transparent or semitransparent type of liquid crystal display panel of the second embodiment according to the invention.

The above description has been given primarily on the reflection type of liquid crystal display panel. However, in the transparent or semitransparent type of liquid crystal display panel, the circularly polarizing plates are adhered to both the substrates. FIG. 20 is a schematic perspective view showing a structure of the transparent or semitransparent type of liquid crystal display panel. When the circularly polarizing plate provided with the λ/4 phase difference plate and the linearly polarizing plate shown in FIGS. 19A and 19B is to be used in the transparent or semitransparent type of liquid crystal display panel, the circularly polarizing plates are adhered to both the main surfaces of the two substrates.

FIG. 20 illustrates a structure in which a circularly polarizing plate having the structure shown in FIGS. 19A and 19B is adhered to one of the substrates. In this liquid crystal display panel, λ/4 phase difference plates 101 and 137 are adhered to the two substrates, respectively, and the lagging axes thereof in the directions indicated by respective arrows 150 and 158 form an angle of 90° therebetween. Likewise, linearly polarizing plates 102 and 138 are adhered such that the directions of the absorption axes thereof indicated by respective arrows 151 and 159 form an angle of 90° therebetween. In the case where the circularly polarizing plate formed of the λ/4 phase difference plate and the linearly polarizing plate shown in FIGS. 19A and 19B is adhered to one of the substrates as shown in FIG. 20, the circularly polarizing plate adhered to the main surface of the other substrate is configured such that the lagging axis forms an angle of 0° with respect to the reference direction, and the absorption axis forms an angle of −45° with respect to the reference direction when viewed from the side of the λ/4 phase difference plate (i.e., when viewed downward from the upper side of the sheet of FIG. 20).

In the vertical alignment type of liquid crystal display panel of this embodiment, the λ/4 phase difference plate has the Nz coefficient of 1.6 or more. By employing this structure, the λ/4 phase difference plate can have the same optical compensation function as the conventional C-plate. Therefore, the view angle can be increased without using the optical compensation film such as a C-plate, and the circularly polarizing plate can be formed of at least thee layers in contrast to the prior art requiring at least four layers. Further, the preferred Nz coefficient for sufficiently increasing the view angle is in a range from 2.5 to 3.0. By employing this structure, remarkable effects can be achieved in the vertical alignment type of liquid crystal display panel having liquid crystal difference dn from 320 nm to 420 nm. Since the λ/4 phase difference plate of the circularly polarizing plate of this embodiment exhibits the reverse wavelength dispersion characteristics, the view angle can be increased.

As shown in FIG. 19A, the lagging axis of the λ/4 phase difference plate of the embodiment forms an angle of about 90° with respect to the reference direction as indicated by arrow 150. For employing this structure, an optical film is extended in a direction of width of the optical film in the manufacturing step of the λ/4 phase difference plate. For example, the optical film in the rolled form is extended in the direction perpendicular to the longitudinal direction. The Nz coefficient can be readily increased by extending the λ/4 phase difference plate in the above direction. The Nz coefficient of the λ/4 phase difference plate of the circularly polarizing plate in this embodiment must take a large value of 1.6 or more, and the above manner facilitates formation of the λ/4 phase difference plate having such a large Nz coefficient.

In this embodiment, the reference direction is parallel to one side of the rectangle. However, this structure is not restrictive, and the reference direction may be included. The plane forms of the circularly polarizing plate and the liquid crystal display panel are not restricted to the rectangle, and may be any other form according to the invention. The circularly polarizing plate of the embodiment is used in the individual liquid crystal display unit, and therefore is rectangular. However, the circularly polarizing plate preferably takes a rolled form, e.g., in such a case that a large quantity of circularly polarizing plate is to be transported. Further, the above operations and effects achieved by the reflection type of liquid crystal display panel can be achieved also by the transparent type and semitransparent type of liquid crystal display panels each configured such that both the substrates are provided with the circularly polarizing plates of the embodiment.

Figure 21:
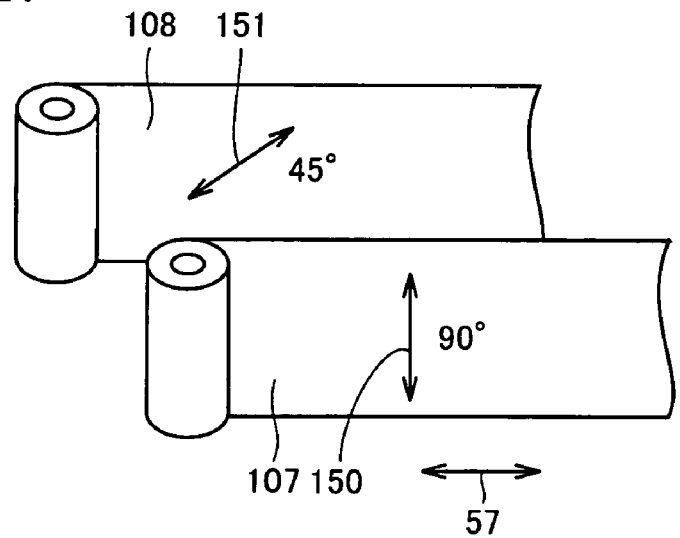
FIG. 21 illustrates the λ/4 phase difference plate in a rolled form and the linearly polarizing plate in a rolled form used in the manufacturing method of the second embodiment according to the invention.

Referring to FIGS. 21 to 26, description will now be given on the methods of manufacturing the circularly polarizing plate and the liquid crystal display panel of the embodiment. As shown in FIG. 21, a λ/4 phase difference plate 107 taking the rolled form and having the Nz coefficient of 1.6 or more is prepared. The reference direction indicated by arrow 57 is parallel to the longitudinal direction of λ/4 phase difference plate 107 or a linearly polarizing plate 108 in the rolled form. λ/4 phase difference plate 107 has the lagging axis in the direction which is indicated by arrow 150 and forms an angle of about +90° with respect to the reference direction indicated by arrow 57. This phase difference plate can be formed by the method disclosed, e.g., in Japanese Patent Laying-Open No. 2000-9912. Linearly polarizing plate 108 has the absorption axis which is indicated by arrow 151 and is inclined by about +45° from the reference direction indicated by arrow 57. This linearly polarizing plate can be formed by the method disclosed, e.g., in Japanese Patent Laying-Open No. 2003-227925.

Figure 22:
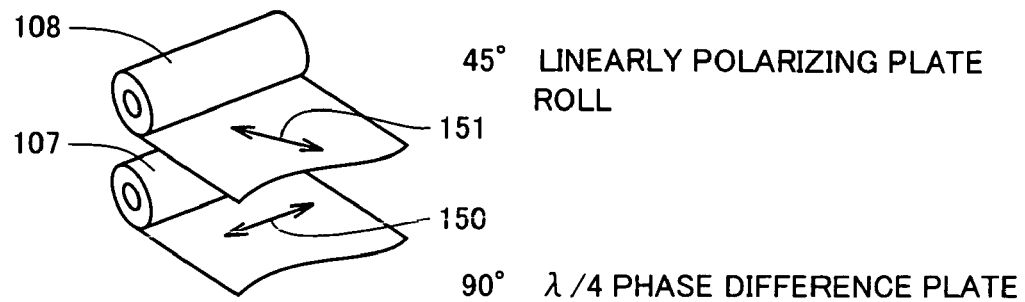
FIG. 22 illustrates a first step in the method of manufacturing the circularly polarizing plate of the second embodiment according to the invention.

First, λ/4 phase difference plate 107 and linearly polarizing plate 108 are arranged such that the longitudinal directions thereof are parallel to each other as shown in FIG. 22.

Figure 23:
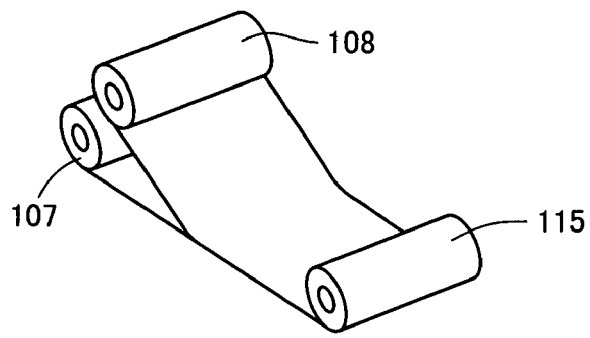
FIG. 23 illustrates a second step in the method of manufacturing the circularly polarizing plate of the second embodiment according to the invention.

Then, the adhering step is performed to adhere the main surfaces of λ/4 phase difference plate 107 and linearly polarizing plate 108 together to form the circularly polarizing plate while keeping the longitudinal direction thereof parallel to each other as shown in FIG. 23. As shown in FIG. 23, a circularly polarizing plate 115 formed by the adhering step is wound into a roll form.

Figure 24:
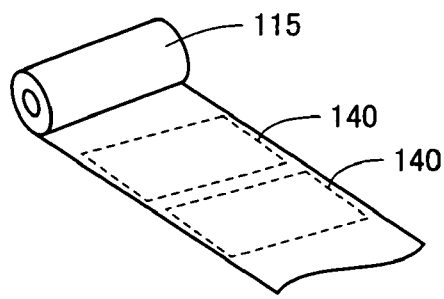
FIG. 24 illustrates a third step in the method of manufacturing the circularly polarizing plate of the second embodiment according to the invention.

Then, circularly polarizing plate 115 wound into the roll form is cut along cutting frames 140 to obtain rectangles as shown in FIG. 24. This cutting is performed such that one side of the rectangle is slightly inclined with respect to the longitudinal direction of the circularly polarizing plate. The inclination angle is, e.g., 10°.

Referring to FIGS. 8A and 8B, it is preferable in the liquid crystal display panel to exhibit a high contrast ratio when viewed in the directions of arrows 65 and 66 in FIG. 8A. More specifically, it is preferable to increase the view angle in the direction parallel to one side of the rectangle of the main surface of the liquid crystal display panel. As indicated by arrows 65 and 67 in FIG. 8B, it is preferable to increase the view angle also in the direction perpendicular to the above one side of the rectangle. By cutting off the rectangle with its one side slightly inclined with respect to the longitudinal direction of the circularly polarizing plate as shown in FIG. 24, the liquid crystal display panel having the rectangular plane form can increase the view angle in the direction parallel or perpendicular to one side of the rectangle.

Figure 25:
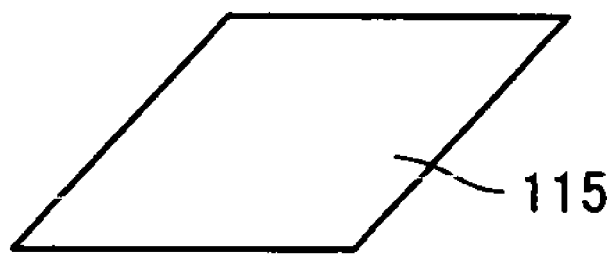
FIG. 25 is a perspective view of the circularly polarizing plate manufactured by the manufacturing method of the second embodiment according to the invention.

FIG. 25 shows the cut-out circularly polarizing plate. Cut-out circularly polarizing plate 115 may have substantially the same sizes as the main surface of the individual liquid crystal display unit, or may have substantially the same sizes as the main surface of the large liquid crystal display unit base including the plurality of individual liquid crystal display units. Cut-out circularly polarizing plate 115 in this embodiment has substantially the same sizes as the main surface of the large liquid crystal display unit base.

Figure 26:
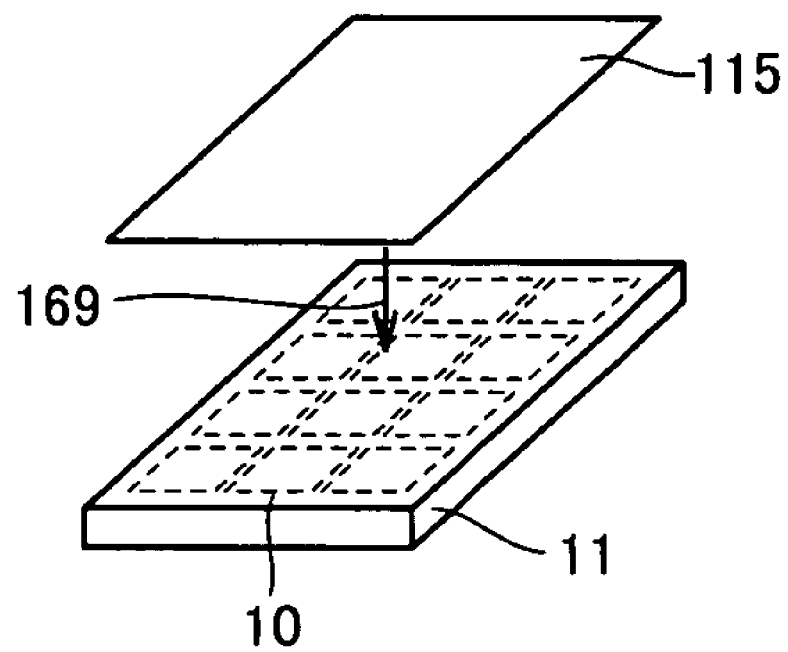
FIG. 26 illustrates a method of manufacturing the liquid crystal display panel of the second embodiment according to the invention.

FIG. 26 illustrates a step of adhering the circularly polarizing plate. As indicated by an arrow 169, cut-out circularly polarizing plate 115 is adhered to the main surface of large liquid crystal display unit base 11. In this adhering step, the λ/4 phase difference plate is located on the substrate side. In the transparent or semitransparent type of liquid crystal display panel, the circularly polarizing plates of the embodiment are adhered to the two opposite substrates, respectively. In this case, another circularly polarizing plate is produced. In this circularly polarizing plate, the λ/4 phase difference plates respectively adhered to the two substrates have the lagging axes forming an angle of 90° therebetween, and have the absorption axes forming an angle of 90° therebetween. For example, when the circularly polarizing plate adhered to one of the substrates has the λ/ 4 phase difference plate and the linearly polarizing plate shown in FIG. 21, the circularly polarizing plate adhered to the other substrate is produced in substantially the same manufacturing method, and employs the λ/4 phase difference plate having the lagging axis forming an inclination angle of 0° with respect to the longitudinal direction indicated by arrow 57 as well as the linearly polarizing plate having the absorption axis forming an inclination angle of +45° (when viewed upward from the lower side of the sheet of FIG. 20) with respect to the longitudinal direction. The circularly polarizing plate thus produced is adhered to the other substrate so that the angle of 90° is formed between the lagging axes, and the angle of 90° is also formed between the absorption axes.

The large liquid crystal display unit base 11 contains the plurality of individual liquid crystal display units 10 represented by broken lines. The large liquid crystal display unit in the embodiment is manufactured by the drop adhering method. In the large liquid crystal display unit, liquid crystal is already stored sealingly in each individual liquid crystal display unit 10. After the step of adhering the circularly polarizing plate(s), large liquid crystal display unit base 11 is cut along the forms of individual liquid crystal display units 10 to obtain individual liquid crystal display units 10.

As described above, the method includes the circularly polarizing plate adhering step of adhering the circularly polarizing plate to the main surface of the large liquid crystal display unit base provided with a plurality of individual liquid crystal display units, and also includes the step performed subsequently to the circularly polarizing plate adhering step for cutting the large liquid crystal display unit base to obtain the liquid crystal display units. Thereby, it is not necessary to adhere an independent circularly-polarizing plate to each individual liquid crystal display unit, and the circularly polarizing plate can be adhered to the plurality of individual liquid crystal display units at a time. Therefore, the operation time required for adhering the circularly polarizing plate can be remarkably reduced, and the method of manufacturing the liquid crystal display panel can have good productivity. By using the circularly polarizing plate of the embodiment, it is possible to manufacture the liquid crystal display panel having good view angle characteristics.

It is preferable that the material of the λ/4 phase difference plate is a film having reverse wavelength dispersion characteristics. By employing this method, the circularly polarizing plate and the vertical alignment type of liquid crystal display panel having further improved view angle characteristics can be manufactured.

In the adhering step shown in FIG. 23, λ/4 phase difference plate 107 may be adhered to one of the main surfaces of linearly polarizing plate 108 while adhering the transparent protective film on the other main surface. By employing this method, the three layers can be simultaneously overlaid together so that the manufacturing time can be further reduced.

As shown in FIG. 23, this embodiment includes the step of winding or rolling up the produced circularly-polarizing plate into the roll form after the adhering step. By employing this step, the circularly polarizing plate according to the embodiment can be manufactured continuously. Also, the large quantity of circularly polarizing plate can have a small volume, and this facilitates transportation, storage, dealing and the like.

The structures, operations, effects and manufacturing method other than the above are substantially the same as those of the first embodiment, and therefore description thereof is not repeated.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The invention can be applied to the circularly polarizing plate and the method of manufacturing the same. In particular, the invention can be effectively applied to the vertical alignment type of liquid crystal display panel and the method of manufacturing the same.

The invention claimed is:

1. A circularly polarizing plate comprising:
   a λ/4 phase difference plate; and
   a linearly polarizing plate having an absorption axis forming an angle of about 45° with respect to a lagging axis of said λ/4 phase difference plate and overlaid on a main surface of said λ/4 phase difference plate, wherein
   said λ/4 phase difference plate has reverse wavelength dispersion characteristics, and has an Nz coefficient of 1.6 or more;
   said circularly polarizing plate has a substantially rectangular plane form,
   said lagging axis forms an angle of about +80° with respect to a reference direction parallel to one side of said substantially rectangular form, and
   said absorption axis forms an angle of about +35° with respect to said reference direction.

2. The circularly polarizing plate according to claim 1, wherein
   said λ/4 phase difference plate has the Nz coefficient of not less than 2.5 and not more than 3.0.

3. The circularly polarizing plate according to claim 1, wherein
   said circularly polarizing plate is cut from a rolled form.

4. A vertical alignment type of liquid crystal display panel comprising the circularly polarizing plate according to claim 1.

5. A circularly polarizing plate comprising:
   a λ/4 phase difference plate; and
   a linearly polarizing plate having an absorption axis forming an angle of about 45° with respect to a lagging axis of said λ/4 phase difference plate and overlaid on a main surface of said λ/4 phase difference plate, wherein said λ/4 phase difference plate has reverse wavelength dispersion characteristics, and has an Nz coefficient of 1.6 or more;

said circularly polarizing plate has a substantially rectangular plane form, said lagging axis forms an angle of about −20° with respect to said reference direction parallel to one side of said substantially rectangular form, and said absorption axis forms an angle of about +25° with respect to said reference direction.

6. The circularly polarizing plate according to claim 5, wherein said λ/4 phase difference plate has the Nz coefficient of not less than 2.5 and not more than 3.0.

7. The circularly polarizing plate according to claim 5, wherein said circularly polarizing plate is cut from a rolled form.

8. A vertical alignment type of liquid crystal display panel comprising the circularly polarizing plate according to claim 5.

9. A circularly polarizing plate comprising:

a λ/4 phase difference plate; and a linearly polarizing plate having an absorption axis forming an angle of about 45° with respect to a lagging axis of said λ/4 phase difference plate and overlaid on a main surface of said λ/4 phase difference plate, wherein said λ/4 phase difference plate has reverse wavelength dispersion characteristics, and has an Nz coefficient of 1.6 or more, wherein said circularly polarizing plate takes a rolled form, and wherein said lagging axis forms an angle of about +80° with respect to said reference direction defined by a longitudinal direction, and said absorption axis forms an angle of about +35° with respect to said reference direction.

10. A circularly polarizing plate comprising:

a λ/4 phase difference plate; and a linearly polarizing plate having an absorption axis forming an angle of about 45° with respect to a lagging axis of said λ/4 phase difference plate and overlaid on a main surface of said λ/4 phase difference plate, wherein said λ/4 phase difference plate has reverse wavelength dispersion characteristics, and has an Nz coefficient of 1.6 or more, wherein said circularly polarizing plate takes a rolled form, and wherein said lagging axis forms an angle of about −20° with respect to said reference direction defined by a longitudinal direction, and said absorption axis forms an angle of about +25° with respect to said reference direction.

* * * * *